United States Patent [19]
Schuh

[11] 3,851,445
[45] Dec. 3, 1974

[54] PACKAGING MACHINE
[76] Inventor: Frank R. Schuh, 445 Chatham Cir., Buffalo Grove, Ill. 60090
[22] Filed: Aug. 28, 1972
[21] Appl. No.: 284,451

[52] U.S. Cl. ................... 53/329, 53/282, 83/326
[51] Int. Cl. ............................................. B65b 7/16
[58] Field of Search ................ 53/282, 329; 83/326

[56] References Cited
UNITED STATES PATENTS

| 3,328,937 | 7/1967  | Newman et al. | 53/282   |
| 3,475,878 | 11/1969 | West          | 83/326 X |
| 3,587,829 | 6/1971  | Sorensen      | 53/329 X |
| 3,706,183 | 12/1972 | Talarico      | 53/282 X |

Primary Examiner—Travis S. McGehee
Attorney, Agent, or Firm—Anthony S. Zummer

[57] ABSTRACT

A packaging machine comprises a base, with a conveyor mounted on the base for longitudinal movement therein. The conveyor includes a plurality of platens for carrying articles. Each of the articles has an open side. A sealing assembly is mounted on the base, and is cooperative with the conveyor for sealing closed the open side of the articles by the application of a continuous film over the open sides of adjacent articles. A slitting assembly is mounted on the base, and is cooperative with the conveyor for slittting the continuous film between adjacent articles so that the articles may be handled as individual articles. The platens of the conveyor are releasable by a platen release, and may be substituted for a second size platen which is capable of carrying an article of a different size. The slitting assembly is adjustable to slit the film at a second distance, so that the apparatus may be conveniently used for a variety of sized articles. The packaging machine also includes a platen release which selectively releases the platens to remove the platens and replace them with platens of another size.

13 Claims, 15 Drawing Figures

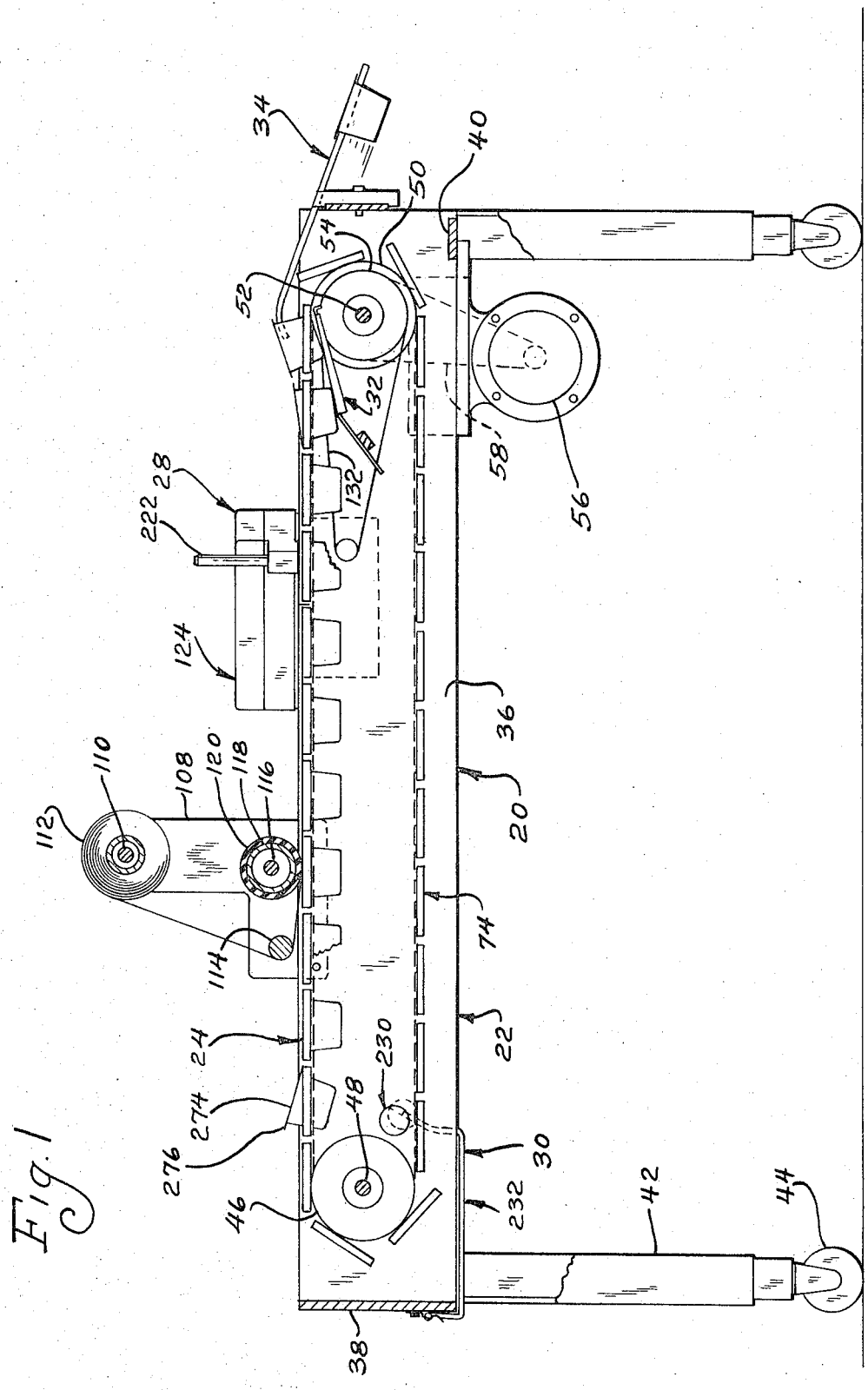

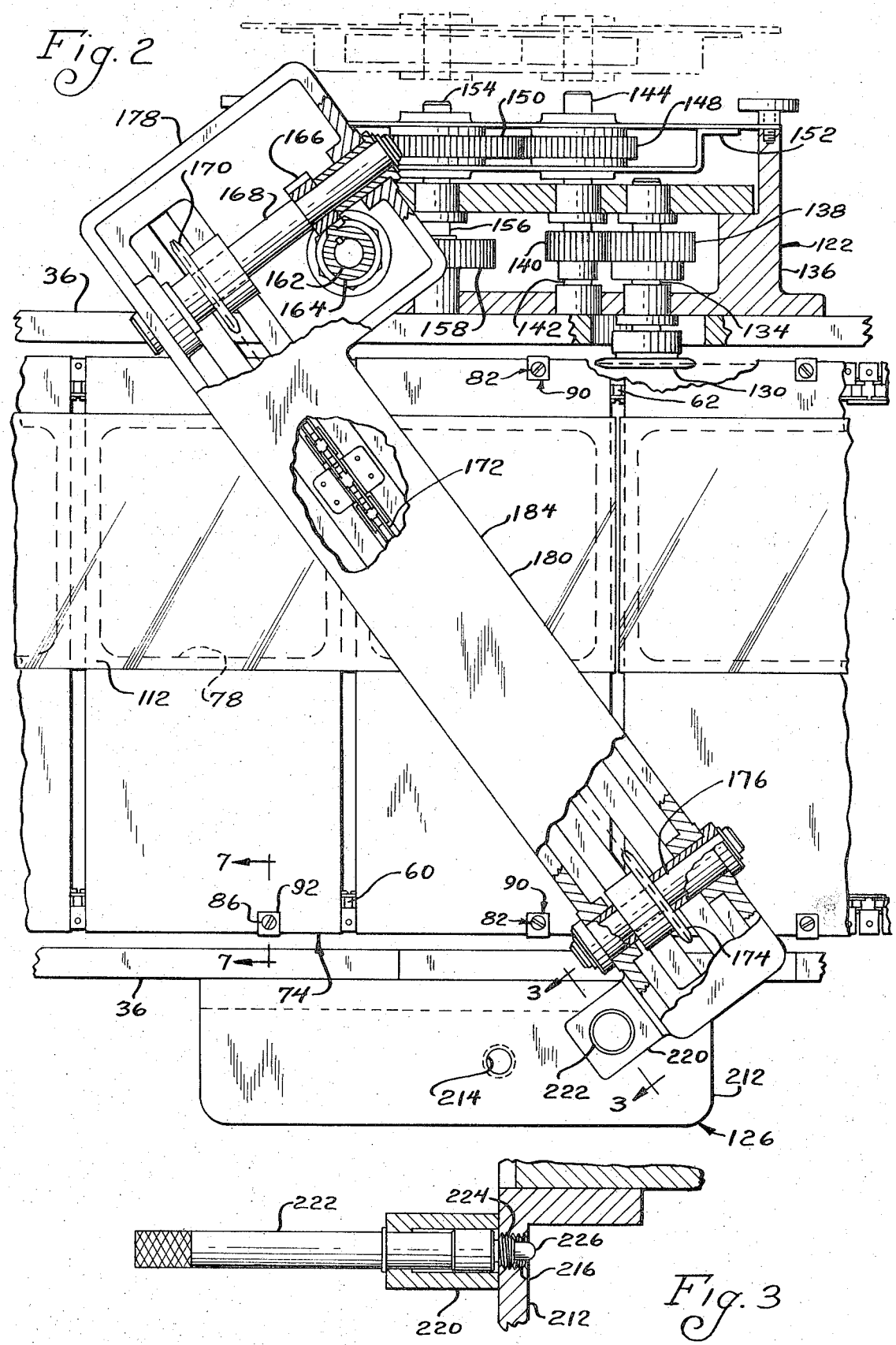

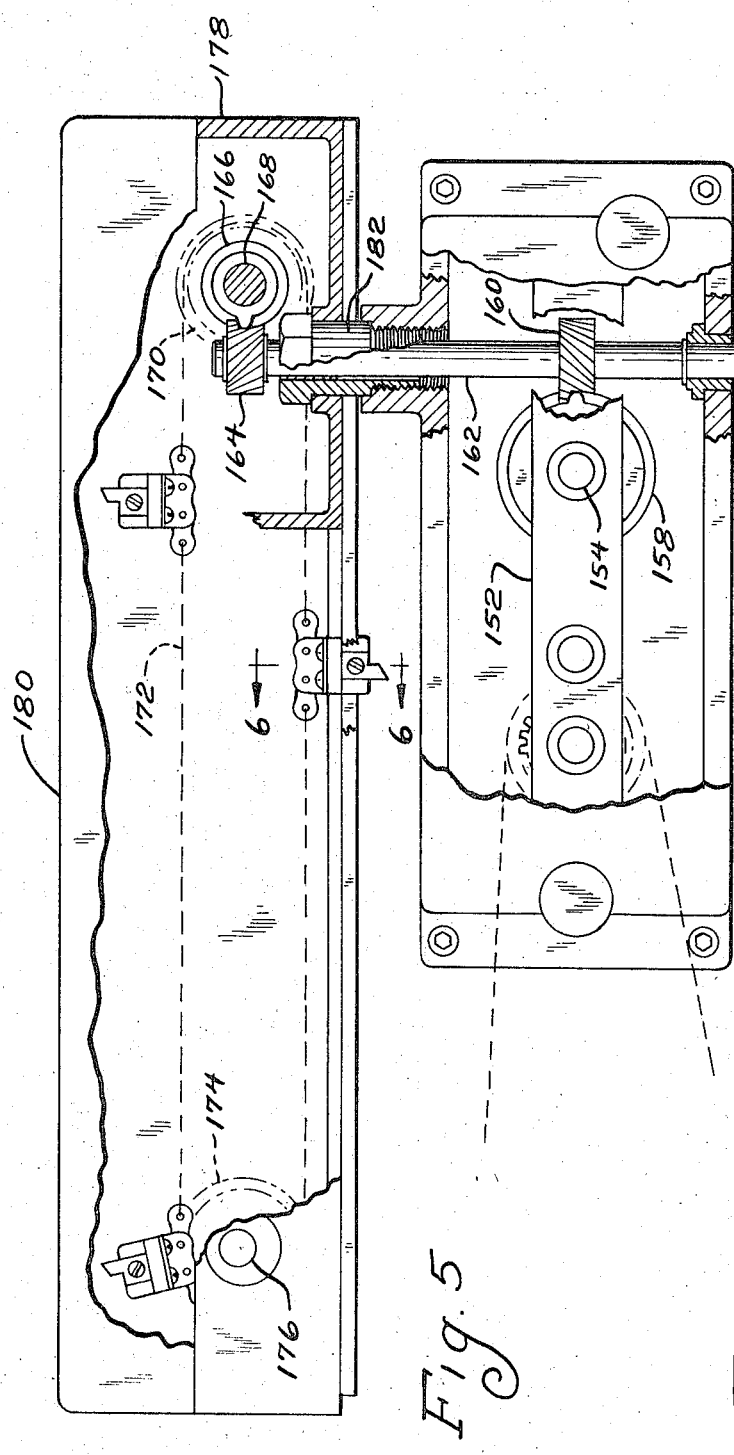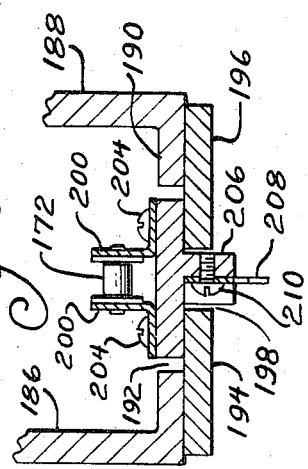

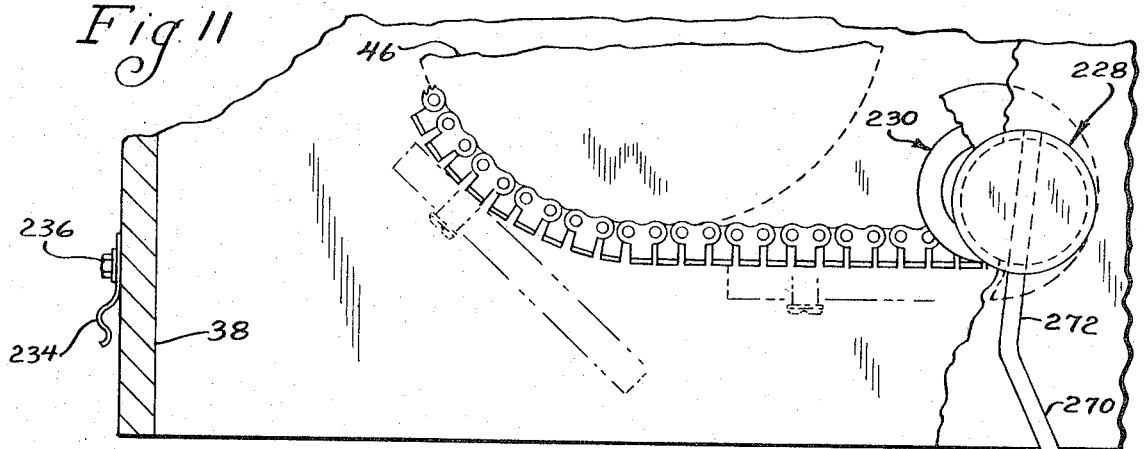
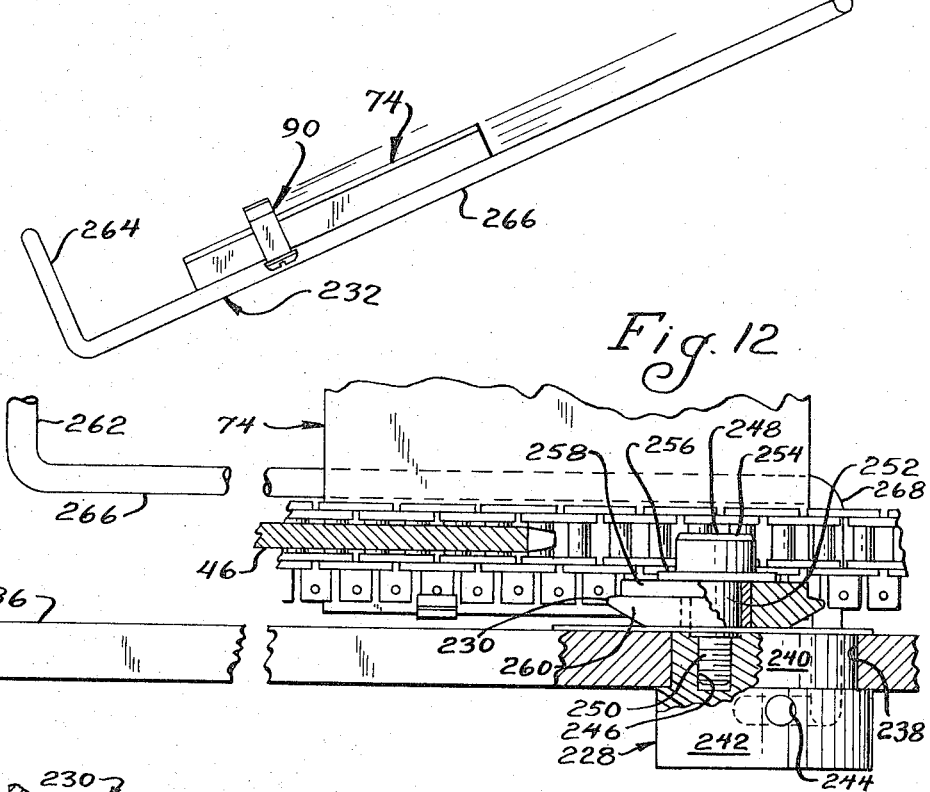
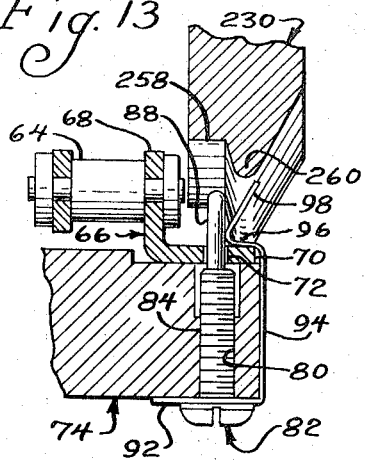
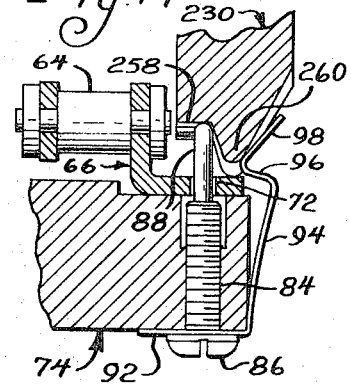
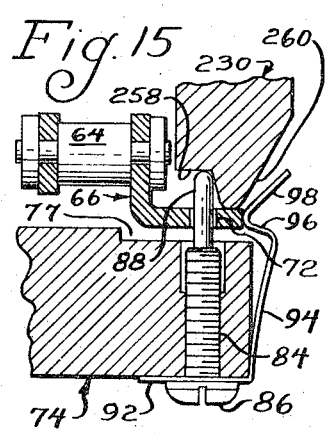

PACKAGING MACHINE

BACKGROUND OF THE INVENTION

Packaging machines for sealing closed a container holding an article are generally well-accepted. The packaging machines are generally rather expensive machines since they are built with a high degree of precision, and must operate at a very fast rate in order to handle a substantial volume of goods. In many operations, it is necessary to package items; but the packager does not have a sufficiently high volume of a given single item so that he may make the necessary investment in a single-purpose machine which packages only a given article or articles of a given size. This means that the businessman who has a small volume is placed at an economic disadvantage since his packaging must be done either by hand or the packaging really does not meet the goods. It follows that there is a need for a packaging machine which may package different size articles by making a simple adjustment to the machine. This allows the small businessman to package articles quickly and efficiently with a minimum of effort, even though his volume for any given article is not sufficiently great to make the investment in a single-purpose machine.

SUMMARY OF THE INVENTION

The instant invention is directed to a packaging machine which includes a base. An idler wheel is rotatably mounted on the base; and a drive sprocket is mounted on the base and spaced away from the idler wheel. The sprocket is driven by a conveyor drive, which is also mounted on the base. A conveyor is mounted on the base and includes a pair of spaced chains mounted in engagement with the idler wheel and the sprocket. The conveyor also includes a plurality of platens, which are adapted to receive a container of a given size. Each of the platens has a platen body. Each of the platen bodies has a pin mounted on each of the opposite sides of the body, which pins are engageable with one of the respective chains. A clip is mounted on each side of the body in cooperation with the pin to hold the platen onto the chain.

A sealing assembly is mounted on the base and is cooperative with the conveyor. The sealing assembly includes a roll of film, which roll of film passes over a film rod. A resilient roller presses the film onto a container carried in a platen under the roller to secure the film to the container and to seal closed the container.

A slitting apparatus is mounted on the base and extending over the conveyor. The slitting apparatus includes a blade, which is driven through a drive connected to the drive for the conveyor. The blade is carried by a chain, which is positioned across the conveyor. The movement of the blade is synchronized with the platens so that the blade moves across the film and with the film to cut the film between two platens. The angular position of the direction of movement of the blade relative to the conveyor may be changed; and the drive mechanism may also be changed to accommodate the change in direction of movement of the blade, so that the slitting may be accommodated to different width platens.

Mounted on the base is a platen release, which selectively engages the platens for releasing the platens when desired in order to replace the platens with platens of a different size.

It is a principal object of the present invention to provide a packaging machine which may be readily adapted to seal closed containers of various sizes.

It is another object of the herein-disclosed invention to provide an improved packaging machine construction wherein the packaging machine includes a conveyor having a plurality of platens, which platens may be replaced to accommodate a different size of article carried by each platen, and a slitting assembly may be adjusted to accommodate a platen of a different size.

It is another object of the present invention to provide a packaging machine which is economical to operate and simple to maintain.

It is a still further object of this invention to provide a packaging machine which may be economically manufactured.

Other objects and uses of the instant invention will become readily apparent to those skilled in the art upon a perusal of the following specification in light of the accompanying drawings.

BRIEF DESCRIPTION OF THE DRAWINGS

FIG. 1 is a side elevational view of a packaging machine embodying the present invention, partially shown in cross-section in order to show better the interrelationship of the various parts;

FIG. 2 is a plan view of a slitting assembly which is a portion of the packaging machine shown in FIG. 1, with portions of the assembly broken away and showing a cassette gear set in phantom view to indicate the ready interchangeability of a portion of a drive;

FIG. 3 is a cross-sectional view taken on Line 3—3 of FIG. 2, showing a housing stop;

FIG. 5 is an end elevational view of a portion of the drive for the slitting assembly and showing a portion of the slitting assembly;

FIG. 6 is a cross-sectional view taken on Line 6—6 of FIG. 5, showing a detailed construction of a cutter of the slitting assembly;

FIG. 11 is an enlarged partial cross-sectional view, showing a portion of a platen release and showing a pair of platens in phantom view were not the platen release in operative engagement with the platens;

FIG. 12 is a partial cross-sectional view, showing a portion of the platen release in operation to release a platen;

FIG. 13 is an enlarged fragmentary cross-sectional view, showing a release wheel of a portion of the platen release about to engage a portion of a clip holding a platen onto a chain;

FIG. 14 is an enlarged cross-sectional view similar to FIG. 13, but showing the release wheel in a more advanced position wherein the wheel resiliently displaces the clip from engagement with a portion of the chain; and FIG. 15 is an enlarged fragmentary cross-sectional view similar to FIGS. 13 and 14, but showing the wheel in a more advanced position wherein a portion of the wheel engages a pin of the platen to force the pin out of its pin aperture and the clip is disengaged from the release wheel to engage a portion of the chain.

DESCRIPTION OF THE PREFERRED EMBODIMENT

Figure 4:
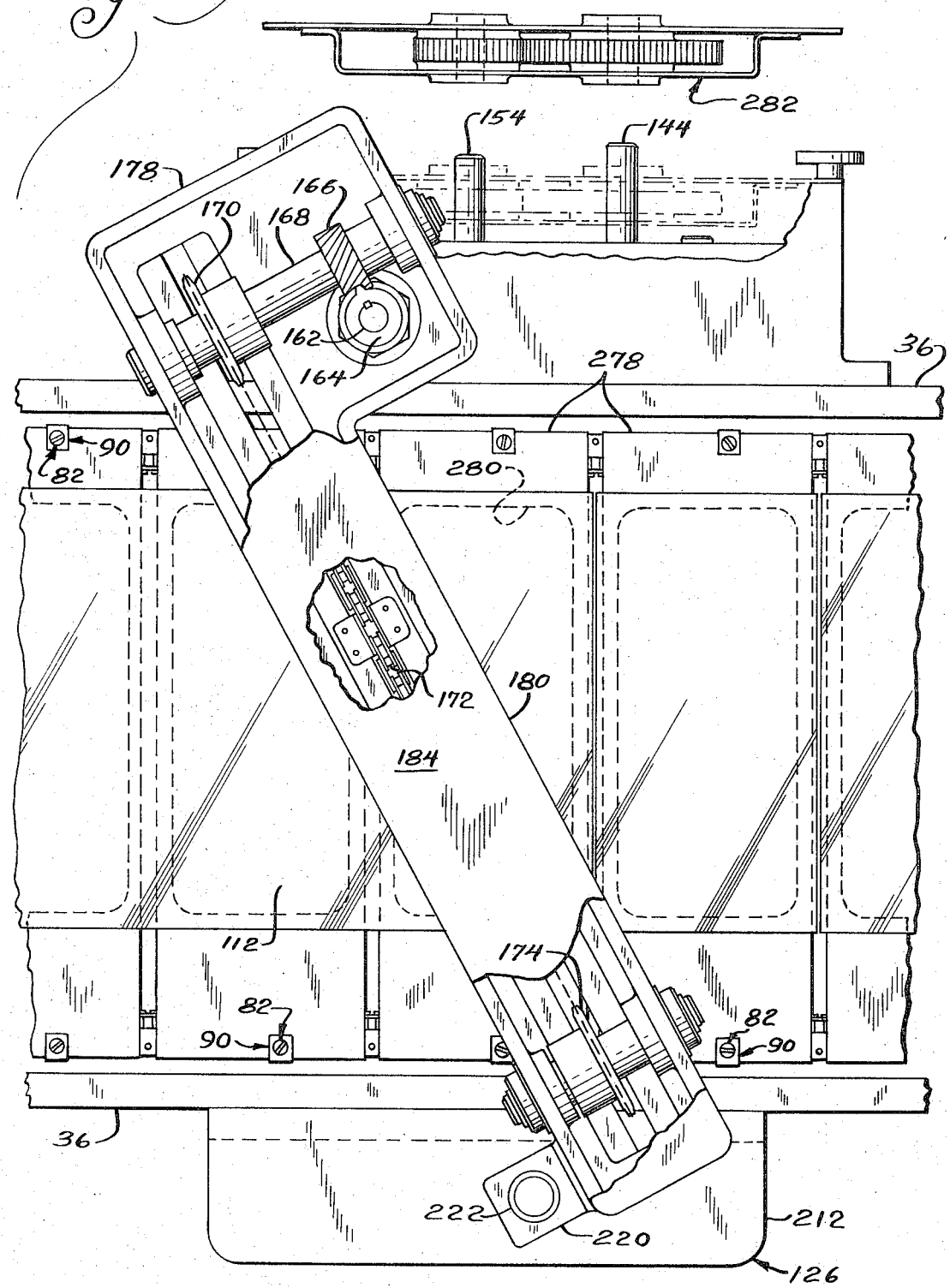
FIG. 4 is similar to FIG. 2, but showing a different size platen constituting a portion of the conveyor and showing the slitting assembly in a second position for slitting a film between the different size platens.

Referring now to the drawings, and especially to FIG. 1, a packaging machine embodying the herein-disclosed invention is shown therein and is generally indicated by numeral 20. The packaging machine 20 generally includes a frame or base 22, an endless conveyor 24 mounted on the base, a sealing assembly 26 mounted on the base and being cooperative with the conveyor 24, a slitting assembly 28 mounted on the base and being cooperative with the conveyor, and a platen release assembly 30 mounted on the base and being cooperative with the conveyor. The packaging machine also includes an ejector 32 mounted on the base adjacent to one end of the conveyor 24; and a slide track 34 is mounted on the base at the one end of the conveyor, cooperative with the ejector 32.

The base 22 generally includes a pair of elongated side walls 36, which have a front wall 38 extending therebetween at one end and a rear bracket 40 extending therebetween at the other end. The base also includes four uprights 42, each of which is connected respectively to one end of the side walls. In this instance, each upright has a wheel 44 on its lower end to provide mobility for the packaging machine.

The conveyor 24 includes an idler wheel 46, which is mounted on an idler wheel shaft 48. The shaft extends between the side walls 36. The conveyor also includes a chain drive sprocket 50, which is mounted on a sprocket shaft 52 between the side walls 36. The drive sprocket shaft 52 is spaced from the idler shaft 48, as may be seen in FIG. 1. Fixed to the shaft 52 is a sprocket drive wheel 54, which is connected to an electric conveyor drive motor 56 through a chain 58. The drive motor 56 provides the source of power for the instant packaging machine.

Figure 7:
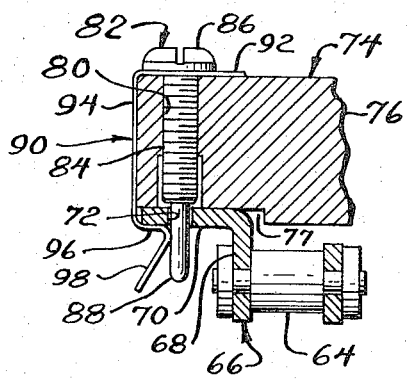
FIG. 7 is an enlarged cross-sectional view taken on Line 7—7 of FIG. 2, showing the details of construction and the interrelationship of a portion of a chain with a portion of a platen.

The conveyor 22 includes a pair of spaced roller chains 60 and 62. The chains 60 and 62 are substantially identical in construction. Each of the roller chains includes a plurality of conventional rollers 64; and each of the chains has a plurality of outwardly-extending platen supports 66 mounted thereon, which may be seen in detail in FIG. 7. Each of the platen supports includes a chain plate 68 and a platen plate 70 formed integral therewith. The platen plate 70 includes a pin aperture 72.

Figure 8:
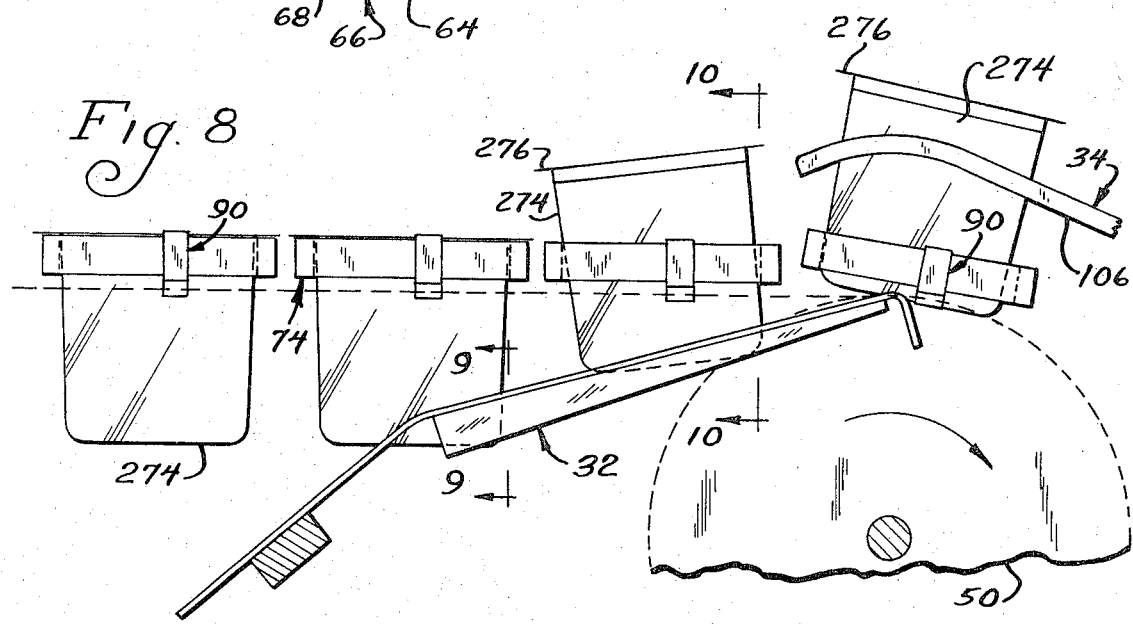
FIG. 8 is an enlarged side elevational view, showing the operation of an ejector operating in connection with containers carried by the conveyor.
Figure 9:
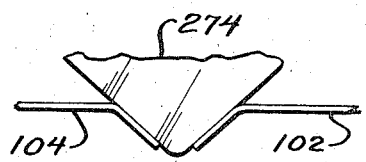
FIG. 9 is an enlarged cross-sectional view, showing a portion of the container in engagement with a portion of the ejector.
Figure 10:
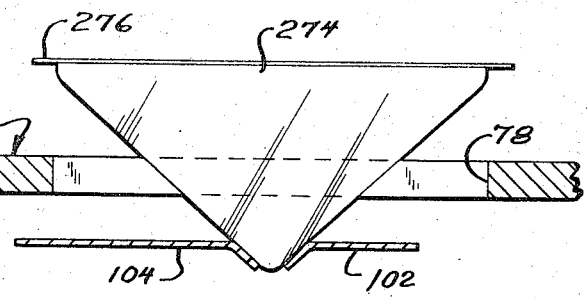
FIG. 10 is an enlarged cross-sectional view taken on Line 10—10 of FIG. 8, showing a portion of the container in engagement with a portion of the ejector and showing some of the detail of the platen.

The conveyor 24 also includes a plurality of identical platens 74. Each of the platens 74 includes a platen body 76. The platen body 76 is generally rectangular in outline and being relatively flat, but with a chain groove 77 adjacent to each outer edge. The platen body includes an article cavity 78 extending through the body for receipt of an article to be carried by the platen, as may be seen in FIGS. 2, 8 and 10. Each platen body has a pin aperture 80 adjacent to each of its opposed outer edges. A platen pin 82 is threadedly mounted in each of the pin apertures 80. Each of the platen pins includes a threaded body 84, with a head 86 on one end and a mounting prong 88 extending from the other end for positioning in a respective pin aperture 72 of a platen plate.

A clip 90 is mounted on each of opposite sides of a platen body in engagement with each of the platen pins. Each clip includes a mounting head 92, containing an aperture through which is positioned its respective platen pin. A resilient side body 94 is formed integral with the head 92 and has a dog 96 formed integral therewith. The dog 96 includes an extension 98. The distance between the head 92 and the dog 96 is substantially equal to the thickness of the platen at the portion of the platen having the pin aperture plus the thickness of the platen plate 70 of the platen support so that the clip fixed to one side of the platen body may engage the platen plate and hold the platen onto the platen support.

The ejector 32 includes a pair of ejector rails 102 and 104, which are engaged by articles carried in the platens. As may be seen in FIG. 8, the ejector rails slope relative to the conveyor, so that an article in the conveyor is raised up out of its platen by the ejector 32 and placed into engagement with the track 34. The track 34, in this instance, includes a pair of side rails 106, which are mounted on the base 22.

The sealing assembly 26 includes a pair of uprights 108. A film support shaft 110 is mounted between the uprights, on which is mounted a roll of pressure-sensitive, transparent, adhesive film 112, although it is readily apparent that a heat-sealable film could be used with appropriate equipment. The film 112 extends around a closure rod 114, which is mounted between the uprights 108. A roller shaft 116 extends between the uprights 108; and a pressure roller 118 is rotatably mounted on the shaft 116. The pressure roller 118 has a resilient cylindrical exterior surface 120, which is engageable with the film 112 as the film passes under the roller.

The slitting assembly 28 may be best seen in FIGS. 2 through 6. The slitting assembly generally includes a slitting assembly drive 122, a blade housing 124 pivotedly mounted on the base 22, a slitter lock 126, and a plurality of identical cutters 128 movably mounted in the housing 124 and driven by the drive 122. The drive 122 includes a slitter drive sprocket 130, which is connected to the sprocket drive wheel 54 of the conveyor through a chain 132. The sprocket 130 is fixed to a shaft 134, which is mounted in a housing 136. A drive pinion 138 is mounted on the shaft 134 and meshes with a gear 140. The gear is, in turn, mounted on a shaft 142, which includes an extension 144. A gear cassette 146 is mounted on the gear extension 144. The gear cassette includes a cassette pinion 148, which is drivingly engageable with the extension 144. The cassette pinion meshes with a cassette gear 150. The cassette pinion 148 and the cassette gear 150 are rotatably mounted in a cassette housing 152. The housing 152 is releasable from the housing 136, for reasons which will become apparent hereinafter. The cassette gear 150 is drivingly connected to an extension 154 of a shaft 156.

A gear 158 is drivingly connected to the shaft 156. The gear 158 meshes with a shaft gear 160, which is mounted on an upright shaft 162. The upright shaft 162 has an upright shaft pinion 164 fixed thereon, meshing with a blade drive gear 166. The blade drive gear is fixed to a blade drive shaft 168, which has blade drive sprocket 170 fixed thereon. The blade drive sprocket has a blade chain 172 meshing therewith and engaging an idler sprocket 174, which is in turn rotatably mounted on the idler sprocket shaft 176. The blade chain has a straight portion between the blade drive sprocket 170 and the idler sprocket, which straight portion extends across the platens and the film. As may be seen in FIG. 2, the straight portion of the blade drive forms an acute angle with the edge of the film.

The housing 124 includes a drive portion 178 and an elongated blade housing 180. The drive portion 178 has a bearing 182 mounted therein, rotatably engageable with the shaft 162. The cable drive shaft 168 is rotatably mounted in the drive portion 178. The housing includes a top 184 and a pair of housing side walls 186 and 188. The housing also includes a bottom 190, which has an opening 192 formed therein. A pair of elongated supports 194 and 196 are fixed to the bottom 190 on opposite sides of the opening 192 to provide a blade groove 198 therebetween.

The blade chain 172 has three identical cutters 128 mounted thereon, each equally spaced from the other two. The cutter construction may be best seen in FIGS. 5 and 6. Each of the cutters includes a pair of chain mounts 200 secured to the blade chain. A cutter base 202 is fixed to the two chain mounts 200 by conventional screws 204. The base 202 includes a blade projection 206, with a cutter blade 208 secured thereto by screw 210. The plane of the blade is parallel to the straight portion of the blade chain.

The slitter lock 126 includes a housing lock plate 212 mounted on one of the side walls 36. The housing lock plate, in this instance, has two lock apertures 214 and 216. A bracket 220 is mounted on the blade housing, as may be seen in FIG. 2. A position pin 222 is slideably mounted in the bracket. The position pin 222 has a thread lock 224 formed integrally therewith, with a guide projection 226 also formed integral therewith. As may be seen in FIG. 3, the pin 222 is threadedly locked in the lock aperture 216 to hold the housing 124 in a selected position so that the straight portion of the chain is at a selected acute angle with the film.

The platen release 30 may be best seen in FIGS. 11 and 12. The platen release 30 generally includes a pair of pivots 228, only one of which is shown herein, a release wheel 230 rotatably mounted on its respective pivot, a U-shaped control arm 232 connected to the pivots 228, and a clip 234 secured to the front end wall 38 by a screw 236.

The pivots 228 are mirror images of each other and are rotatably mounted in a respective aperture 238 in its respective side wall 36. Only one of the pivots 228 is shown herein and described herein. The pivot 228 includes a body 240, which is rotatably mounted in the aperture 238. A head 242 is formed integral with the body 240. A radial rod aperture 244 is formed in the head 242 to receive a portion of the control arm 232. The body 240 has a threaded screw aperture 246 formed therein, offset from the center of the body to receive a screw shaft 248. The screw shaft 248 includes a threaded fastener portion 250, threadedly mounted in the screw aperture 246. A shaft body 252 is formed integral with the fastener portion 250 and has the release wheel 230 rotatably mounted thereon. A head 254 is formed integral with the shaft body 252.

As was mentioned above, the release wheel 230 is rotatably mounted on the shaft body 252. A washer 256 is rotatably mounted on the shaft body 252 in engagement with the head 254 and the release wheel 230. The release wheel 230 includes a main ejector body 258, which is adapted for engagement with the mounting prongs 88 of a respective platen pin. A beveled spring flange 260 is formed integral with the ejector body 258.

The control arm 232 is symmetrical in its configuration and includes at its center an arm lock 262, which has formed integral with opposite ends thereof offsets 264. Formed integral with each of the offsets is a pallet rail 266, with a second offset 268 formed integral therewith. Formed integral with each of the offsets 268 is an extension 270. Each extension 270 has a lock portion 272 formed integral therewith, which extension is fixedly positioned in its respective radial rod aperture 244.

In the operation of the packaging machine 20, electrical power is delivered to the drive motor 56 from a source which is not shown. The drive motor, in turn, turns the sprocket drive wheel 54 to pull the chains 60 and 62 over the sprocket, which in turn carries the platens 74. A container or article 274 is positioned in each article cavity 78 of each of the platens. Each of the containers 274 is open on its upright side and has a flange 276 on its upright side. As the platens move along, the containers are carried under the pressure roller 118 so that the film 112 is placed into adhesive engagement with the flange 276. The platens are moved along by their chains, with the containers 274 pulling the film 112 off its roll. As the platens with the containers arrive at the slitting assembly 28, one of the cutters 128 moves between a pair of adjacent platens so that the blade of the cutter engages the edge of the film 112 at an acute angle between the platens. As the conveyor is being moved by the drive motor 56, the slitting assembly drive 122 moves the cutter simultaneously. The gearing of the conveyor and the drive assembly for the cutter are synchronized so that the blade 208 of the cutter moves perpendicularly across the length of the film, but the attitude of the blade relative to the direction of movement of the film being an acute angle. The blade moves perpendicularly across the direction of movement of the conveyor, at the same time moving with the conveyor to have a perpendicular cut. As was mentioned above, there are three cutters mounted on the chain 172, so that, as each space between the platens arrives at the slitting apparatus, a cutter is moved into position between the platens to cut uniform selected lengths of the film and thereby release the containers from each other.

After the containers 274 are separated, each of the articles then engages the ejector 32. Each container slides up along the ejector, out of its respective cavity, and the platen pushes each container onto the slide track 34 so that each container is then supported by its flange on the slide track 34 and carried by gravity to a unloading station, which is not shown herein.

As was mentioned above, the platen release assembly 30 may be utilized to release automatically the platens 74 from their chains. During normal operation of the packaging machine, the platen release assembly 30 is held in the attitude shown in FIG. 1, with the arm lock 262 held up against the front wall by the clip 234. When it is desired to remove the platens from the chains 60 and 62, the arm lock 262 is released from the clip 234; and the control arm 232 is pushed downward to rotate the pivots 228. As was mentioned above, the screw shafts 248 are offset on the pivots 228 so that the release wheels 230 are moved downward into engagement with the clips 90.

Referring now specifically to FIGS. 13 through 15, which shows the operation of one of the release wheels, it may be seen how a platen, which its clip 90, moves forward toward the release wheel until the spring flange 260 of the release wheel engages the extension 98 of the clip 90, pushing the extension 98 and the dog 96 outward away from the platen plate 70. As the platen moves further toward the wheel, the ejector body 258 engages the end of the mounting prong 88 of the platen pin 82, forcing the platen pin downward and thus carrying the platen 74 with it until the dog 96 of the clip 90 passes the platen plate 70; and the weight of the platen then tends to carry further the platen down until the dog 96 passes the platen plate 70, so that the resilience of the side body 94 tends to push the extension 98 against the platen plate and thus snap the platen away from the platen plate. Consequently, the platen falls onto the platen rails 266 and slides down into engagement with the offsets 264, from which the platen is picked up by an operator. From the foregoing, it may be seen how the platens 74 are readily removed from the chains.

Once the platens are removed, a second set of platens 278 are mounted on the chains 60 and 62. The construction of the platens 278 is substantially identical to the platens 74, except that the second platens 278 are shorter, as may be seen in FIG. 4, and each of the platens has a wider cavity 280 for receipt of a different size article. Once the platens 74 are removed and the platens 278 are mounted on the chains, the platens 278 are held onto the chains in the same manner as that described in connection with platens 74.

The slitting assembly 28 is adjusted so that the cutters 128 pass between adjacent platens 278. The blade housing 124 is pivoted by first releasing the position pin 222 and raising the pin in the bracket 220. The entire housing is pivoted about the upright shaft 162 until the position pin 222 is positionable in the lock aperture 214, where the lock 224 is threadedly mounted in the lock aperture 214. It is evident that the angular position of the straight portion of the blade chain is changed by pivoting the housing, though the angle between the blade chain and the film remains an acute angle. With the change in angular disposition of the blade chain, it is necessary to adjust the rate of movement of the cutters across the film. The adjustment is simply and easily made. The gear cassette 146 is replaced by a second gear cassette 282, so that the speed of the cutters is synchronized with the conveyor. The gear cassettes are exchanged simply by releasing the cassette housing 152, removing the entire cassette 146, and substituting the cassette 282 on the shaft extensions 144 and 154. The ratio of the gear and pinion of cassette 282 provides proper rate of movement of the cutter relative to the rate of movement of the platens and the film.

The platens 278 are loaded in the same manner as described above. The film 112 is applied to the top of the containers loaded in the platens. The containers are ejected from the platens by means of the ejector 32, and are delivered to the slide track 34, which is appropriately positioned to receive the containers. The operation of the slitting assembly 28 is the same as that described above, except for the changes in specific rate of movement.

Although only two lengths of platens have been discussed herein, it is readily apparent that any length of platen may be used with the subject packaging machine by appropriately angularly positioning the housing of the slitting assembly relative to the conveyor and placing an appropriate gear cassette onto the shaft extensions 144 and 154.

As was mentioned above, the platens may be easily removed and another size platen may be placed on the conveyor. The instant packaging machine may be easily and simply maintained in view of the fact that there are very few parts; and the synchronization of the packaging machine is relatively simple. Furthermore, the construction of the machine is such that it may be simply and economically manufactured.

Although a specific embodiment of the present packaging machine has been shown and described in detail above, it is readily apparent that those skilled in the art may make various modifications and changes without departing from the spirit and scope thereof. It is to be expressly understood that the instant invention is limited only by the appended claims.

I claim:

1. A packaging machine including a base, a continuous conveyor mounted on the base, said conveyor including a drive chain, a plurality of platens releasably locked to the drive chain, each of said platens adapted for carrying a container having an open side, means for driving the drive chain to move the conveyor, a sealing assembly mounted on the base and being cooperative with the conveyor, said sealing assembly including means for applying a continuous film of material to the open side of each of the containers carried by the platens, the conveyor includes a second drive chain spaced apart from the first-mentioned drive chain and is driven simultaneously therewith, each of the platens of the conveyor having a pair of clips on opposite sides thereof engageable with a portion of one of the drive chains to hold the platen onto the clip, and a platen release mounted on the base and being selectively engageable with the clips for releasing selectively the platens from the chains to remove the platens.

2. A packaging machine including a base, a continuous conveyor mounted on the base, said conveyor including a drive chain, a plurality of platens releasably locked to the drive chain, each of said platens adapted for carrying a container having an open side, means for driving the drive chain to move the conveyor, a sealing assembly mounted on the base and being cooperative with the conveyor, said sealing assembly including means for applying a continuous film of material to the open side of each of the containers carried by the platens, and a slitting assembly mounted on the base, said slitting assembly including a blade movable between adjacent platens transverse to the direction of movement of the platens and simultaneously moving with the platens for separating the continuous film applied to the containers carried in the adjacent platens, the blade defines a plane which is aligned with the straight line portion of the chain, whereby the blade enters the film at an acute angle to the length of the film and travels through the film at said acute angle to cut the film.

3. A packaging machine including a base, a continuous conveyor mounted on the base, said conveyor including a drive chain, a plurality of platens releasably locked to the drive chain, each of said platens adapted for carrying a container having an open side, means for driving the drive chain to move the conveyor, a sealing assembly mounted on the base and being cooperative with the conveyor, said sealing assembly including means for applying a continuous film of material to the open side of each of the containers carried by the platens, and a platen release mounted on the base selectively engageable with a portion of each platen for releasing the platen from the drive chain.

4. A packaging machine including a base, a continuous conveyor mounted on the base, said conveyor including a drive chain, a plurality of platens releasably locked to the drive chain, each of said platens adapted for carrying a container having an open side, means for driving the drive chain to move the conveyor, a sealing assembly mounted on the base and being cooperative with the conveyor, said sealing assembly including means for applying a continuous film of material to the open side of each of the containers carried by the platens, the conveyor includes an idler wheel rotatably mounted on the base, a drive sprocket rotatably mounted on the base spaced away from the idler wheel, said drive chain spaced from and parallel to the first-mentioned drive chain, said pair of drive chains mounted in engagement with the idler wheel and the drive sprocket, each of the chains having a plurality of platen supports, each of the platen supports having an outwardly-extending platen plate, each platen plate having a pin aperture contained therein, each of the platens having a platen body, a platen pin mounted on each of opposed sides of the platen body, each of said pins being positionable in a pin aperture of its respective platen plate, and a clip mounted on the platen and being engageable with the platen plate to hold the respective side of the platen in engagement with the platen plate and to hold the pin in its respective pin aperture.

5. A packaging machine including a base, a continuous conveyor mounted on the base, said conveyor including a drive chain, a plurality of platens releasably locked to the drive chain, each of said platens adapted for carrying a container having an open side, means for driving the drive chain to move the conveyor, a sealing assembly mounted on the base and being cooperative with the conveyor, said sealing assembly including means for applying a continuous film of material to the open side of each of the containers carried by the platens, each of the platens having a cavity extending through the body of the platen for receiving a container, an ejector mounted below a portion of the conveyor and engageable with the containers carried by the platens to expel the containers from the respective platens as the platens are moved past the ejector, a slitting assembly mounted on the base, said slitting assembly including a blade movable between adjacent platens transverse to the direction of movement of the platens and simultaneously moving with the platens for separating the continuous film applied to the containers carried in the adjacent platens, each of the platens of the container has a pin adjacent to one side thereof engageable with the drive chain for holding the respective platen on the drive chain and a clip engaging the respective platen and a portion of the drive chain to cooperate with the pin to hold the platen onto the drive chain, and a platen release mounted on the base selectively engageable with the clip and pin of each of the platens for releasing that platen from the drive chain.

6. A packaging machine including a base, a continuous conveyor mounted on the base, said conveyor including a drive chain, a plurality of platens releasably locked to the drive chain, each of said platens adapted for carrying a container having an open side, means for driving the drive chain to move the conveyor, a sealing assembly mounted on the base and being cooperative with the conveyor, said sealing assembly including means for applying a continuous film of material to the open side of each of the containers carried by the platens, a platen release mounted on the base selectively engageable with a portion of each platen for releasing that platen from the drive chain, and a slitting assembly mounted on the base, said slitting assembly including a blade movable between adjacent platens transverse to the direction of movement of the platens and simultaneously moving with the platens for separating the continuous film applied to the containers carried in the adjacent platens.

7. A packaging machine including a base, a continuous conveyor mounted on the base, said conveyor including a drive chain, a plurality of platens releasably locked to the drive chain, each of said platens adapted for carrying a container having an open side, means for driving the drive chain to move the conveyor, a sealing assembly mounted on the base and being cooperative with the conveyor, said sealing assembly including means for applying a continuous film of material to the open side of each of the containers carried by the platens, each of the platens of the conveyor has a pin adjacent to one side thereof engageable with the drive chain for holding the respective platen on the drive chain and a clip engaging the respective platen and a portion of the drive chain to cooperate with the pin to hold the platen onto the drive chain, and a platen release mounted on the base selectively engageable with each clip and each pin for releasing selectively the clip and forcing the pin out of engagement with the drive pin.

8. A packaging machine including a base, a continuous conveyor mounted on the base, said conveyor including a drive chain, a plurality of platens releasably locked to the drive chain, each of said platens adapted for carrying a container having an open side, means for driving the drive chain to move the conveyor, a sealing assembly mounted on the base and being cooperative with the conveyor, said sealing assembly including means for applying a continuous film of material to the open side of each of the containers carried by the platens, a slitting assembly mounted on the base, said slitting assembly including a blade movable in between adjacent platens transverse to the direction of movement of the platens and simultaneously with the platens for separating the continuous film applied to the containers carried by adjacent platens, wherein each of the platens of the conveyor has a pin adjacent to one side thereof engageable with the drive chain for holding the respective platen on the drive pin and a clip engaging the respective platen and a portion of the drive chain to cooperate with the pin to hold the platen onto the drive chain, and a platen release mounted on the base below a portion of the conveyor selectively engageable with each clip and each pin for releasing selectively the platen from the drive chain and disengaging the pin from engagement with the drive chain to release the platen.

9. A packaging machine including a base, a continuous conveyor mounted on the base, said conveyor including a drive chain, a plurality of platens releasably locked to the drive chain, each of said platens adapted for carrying a container having an open side, means for driving the drive chain to move the conveyor, a sealing assembly mounted on the base and being cooperative with the conveyor, said sealing assembly including means for applying a continuous film of material to the open side of each of the containers carried by the platens, each of the platens of the conveyor has a pin mounted therein adjacent to one side thereof releasably engageable with the drive chain and a clip engaging the respective platen and a portion of the drive chain to cooperate with the chain to hold the platen onto the drive chain, a release pivot mounted in the base adjacent to a portion of the drive chain, a release wheel shaft mounted on the release pivot offset from the center of the release pivot, and a release wheel rotatably mounted on the release wheel shaft and being rotatable on said shaft, said release wheel having a spring flange selectively engageable with a portion of a clip for disengaging the clip from a drive chain, said release wheel having an ejector body selectively engageable with a pin cooperative with the clip for forcing the pin out of engagement with the drive chain to release selectively the platen from the drive chain.

10. A packaging machine including a base, a continuous conveyor mounted on the base, said conveyor including a drive chain, a plurality of platens releasably locked to the drive chain, each of said platens adapted for carrying a container having an open side, means for driving the drive chain to move the conveyor, a sealing assembly mounted on the base and being cooperative with the conveyor, said sealing assembly including means for applying a continuous film of material to the open side of each of the containers carried by the platens, a housing pivotedly mounted on said base for being angularly positioned relative to the length of said continuous film, a movable chain mounted in the housing and being pivotal with the housing, said chain having a portion in a straight line positionable in at least two acute angles relative to the length of the chain by angular movement with the housing, a blade engageable with the film mounted on the chain to be moved thereby, a lock connected to the housing for selectively angularly positioning the housing and the straight line portion of the chain relative to the direction of the movement of the film, a drive connected to the drive sprocket and to the chain for moving the chain and the blade through the film, said drive having a pair of removable gears for determining the rate of movement of the blade through the film when the housing is positioned in a given angular position to cut the film in a given uniform selected length, and a second pair of removable gears for replacing the first-mentioned pair of removable gears for determining a second rate of movement of the blade through the film when the straight line portion of the chain is positioned in a second given angle to cut the film perpendicular to the length of the film in a second given selected length of the film.

11. A packaging machine including a base, a continuous conveyor mounted on the base, said conveyor including a drive chain, a plurality of platens releasably locked to the drive chain, each of said platens adapted for carrying a container having an open side, means for driving the drive chain to move the conveyor, a sealing assembly mounted on the base and being cooperative with the conveyor, said sealing assembly including means for applying a continuous film of material to the open side of each of the containers carried by the platens, a continuous chain movably mounted relative to the conveyor, said continuous chain having a straight line portion positioned at an acute angle to the length of the film carried on the conveyor and extending across the width of the conveyor, said straight line portion of the chain being angularly positionable in respect to the length of the film, a lock for holding the straight line portion of the chain at a selected angle, a blade engageable with the film material mounted on the chain and movable across the film for separating the film, a drive connected to the chain for moving the blade through the film, said drive including a pair of removable gears regulating the rate of movement of the blade relative to the movement of the film to cut the film perpendicularly to the length of the film in a uniform selected length when the straight line portion of the chain is at a given acute angle, and a second pair of gears for replacing the first-mentioned pair of removable gears in the drive for determining a second rate of movement of the blade through the film when the straight line portion of the chain is positioned at a second given angle to cut the film perpendicular to the length of the film in a second given selected length of the film.

12. A packaging machine including a base, a continuous conveyor mounted on the base, said conveyor including a drive chain, a plurality of platens releasably locked to the drive chain, each of said platens adapted for carrying a container having an open side, means for driving the drive chain to move the conveyor, a sealing assembly mounted on the base and being cooperative with the conveyor, said sealing assembly including means for applying a continuous film of material to the open side of each of the containers carried by the platens, the conveyor including an idler wheel rotatably mounted on the base, a drive sprocket rotatably mounted on the base spaced away from the idler wheel, a second drive chain spaced from and parallel to the first-mentioned drive chain, said pair of drive chains mounted in engagement with the idler wheel and the drive sprocket, each of the chains having a plurality of platen supports, each of the platen supports having an outwardly extending platen plate, each of said platen plates having a pin aperture contained therein, each of the platens having a platen body, a platen pin mounted on each of opposed sides of the platen body, each of the pins being positionable in the pin aperture of its respective platen plate, a clip mounted on the platen and being engageable with the platen plate to hold the respective side of the platen in engagement with the platen plate and to hold the pin in its respective pin aperture, a pair of release pivots mounted on opposed sides of the base, a release wheel shaft mounted on each of the release pivots offset from the center of the release pivot, a release wheel rotatably mounted on each of the release wheel shafts, each of said release wheels including a spring flange selectively engageable with the clip for disengaging the clip from the platen plate, each of said release wheels having an ejector body formed integral with the spring flange and selectively engageable with a platen pin for forcing the platen pin out of its respective pin aperture after the respective spring flange has disengaged the respective platen plate, and a control arm connected to both of the release pivots for selectively pivoting the release pivots for selectively placing the release wheel into engagement or out of engagement with the respective clips and pins, said control arm being positionable below a portion of the conveyor for catching platens released from the chains.

13. A packaging machine including a base, a continuous conveyor mounted on the base, said conveyor including a drive chain, the conveyor having an idler wheel rotatably mounted on the base, a drive sprocket rotatably mounted on the base spaced away from the idler wheel, a second drive chain spaced from and parallel to the first-mentioned drive chain, said pair of drive chains mounted in engagement with the idler wheel and the drive sprocket, a plurality of platens releasably locked to the drive chain, each of said platens adapted for carrying a container having an open side, means for driving the drive chain to move the conveyor, each of the chains having a plurality of platen supports, each of the platen supports having an outwardly-extending platen plate, each platen plate having a pin aperture contained therein, each of the platens having a platen body, a platen pin mounted on each of the opposed sides of the platen body, each of said pins being positionable in a pin aperture of its respective platen plate, a clip mounted on the platen and being engageable with the platen plate to hold the respective side of the platen in engagement with the platen plate and to hold the pin in its respective pin aperture, a sealing assembly mounted on the base and being cooperative with the conveyor, said sealing assembly including means for applying a continuous film of material to the open side of each of the containers carried by the platens, a continuous chain mounted on the base, said continuous chain being movable relative to the conveyor, said continuous chain having a straight line portion positioned at an acute angle to the length of the film and extending across the width thereof, a blade engageable with the film mounted on the continuous chain to be moved thereby across the film to separate the film, said blade being movable between adjacent platens, said straight line portion of the continuous chain along with the blade carried thereby being selectively angularly positionable relative to the length of the film, means for holding the straight line portion of the continuous chain relative to the conveyor at a given selected angle, a drive connected to the continuous chain and being drivingly connected to the drive sprocket for moving the blade through the film between adjacent platens, a pair of removable gears constituting a portion of the drive for determining a rate of movement of the blade through the film relative to the movement of the film to cut the film perpendicularly to the length of the film in a given uniform selected length, and a second pair of gears being replaceable for the first-mentioned pair of removable gears for determining a second rate of movement of the blade through the film when the angle of the straight line portion of the continuous chain is at a second angle to cut the film perpendicularly to the length of the film in a second given selected length of the film.

* * * * *

PO-1050
(5/69)

UNITED STATES PATENT OFFICE
CERTIFICATE OF CORRECTION

Patent No. 3,851,445         Dated December 3, 1974

Inventor(s) Frank R. Schuh

It is certified that error appears in the above-identified patent and that said Letters Patent are hereby corrected as shown below:

Column 10, Line 60, after "simultaneously", insert --moving--.

Signed and sealed this 21st day of January 1975.

(SEAL)
Attest:

McCOY M. GIBSON JR.
Attesting Officer

C. MARSHALL DANN
Commissioner of Patents